US011750750B2

(12) United States Patent
Hara

(10) Patent No.: US 11,750,750 B2
(45) Date of Patent: Sep. 5, 2023

(54) INFORMATION PROCESSING SYSTEM AND INFORMATION PROCESSING METHOD FOR TRANSMITTING, PRINTING AND SCANNING TEACHING MATERIAL CONTENT TO BE GRADED

(71) Applicant: Seiko Epson Corporation, Tokyo (JP)

(72) Inventor: Motoaki Hara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/324,913

(22) Filed: May 19, 2021

(65) Prior Publication Data

US 2021/0368048 A1 Nov. 25, 2021

(30) Foreign Application Priority Data

May 22, 2020 (JP) .................................. 2020-089425

(51) Int. Cl.
*H04N 1/00* (2006.01)
*H04N 1/34* (2006.01)
*G06F 3/12* (2006.01)
*G09B 5/02* (2006.01)
*G09B 7/02* (2006.01)

(52) U.S. Cl.
CPC ....... *H04N 1/00244* (2013.01); *G06F 3/1207* (2013.01); *G06F 3/1288* (2013.01); *G09B 5/02* (2013.01); *G09B 7/02* (2013.01); *H04N 1/00074* (2013.01); *H04N 1/342* (2013.01); *H04N 1/00204* (2013.01)

(58) Field of Classification Search
None
See application file for complete search history.

(56) References Cited

U.S. PATENT DOCUMENTS

| | | | | |
|---|---|---|---|---|
| 6,505,031 | B1* | 1/2003 | Slider | G09B 5/02 434/118 |
| 7,945,545 | B1* | 5/2011 | Sorkin | G06F 16/9562 715/811 |
| 2004/0264811 | A1* | 12/2004 | Yano | G06F 16/93 382/306 |
| 2005/0200923 | A1* | 9/2005 | Shimada | H04N 1/00355 358/537 |

(Continued)

FOREIGN PATENT DOCUMENTS

JP 2004-333525 11/2004

*Primary Examiner* — Miya J Williams
(74) *Attorney, Agent, or Firm* — WORKMAN NYDEGGER

(57) ABSTRACT

In an information processing system including an information processing server and a multifunction machine, the information processing server transmits print instruction information instructing printing of teaching material content and an answerer ID to the multifunction machine. Upon receiving the print instruction information, the multifunction machine generates teaching material content printed material, reads a print surface of answered teaching material content printed material, and transmits read data corresponding to a read image. The information processing server acquires the answerer ID from the received read data and performs processing for providing the read image for a terminal device of a person concerned having a predetermined relationship with an answerer having the acquired answerer ID.

8 Claims, 7 Drawing Sheets

(56) References Cited

U.S. PATENT DOCUMENTS

| | | | |
|---|---|---|---|
| 2008/0050715 A1* | 2/2008 | Golczewski | G06Q 20/102 |
| | | | 434/350 |
| 2008/0117456 A1* | 5/2008 | Yamaguchi | H04N 1/32208 |
| | | | 358/1.15 |
| 2016/0224516 A1* | 8/2016 | Clar | G06F 40/169 |
| 2019/0272769 A1* | 9/2019 | Yasuoka | G06V 30/40 |
| 2020/0294411 A1* | 9/2020 | Nakamura | G09B 7/02 |

* cited by examiner

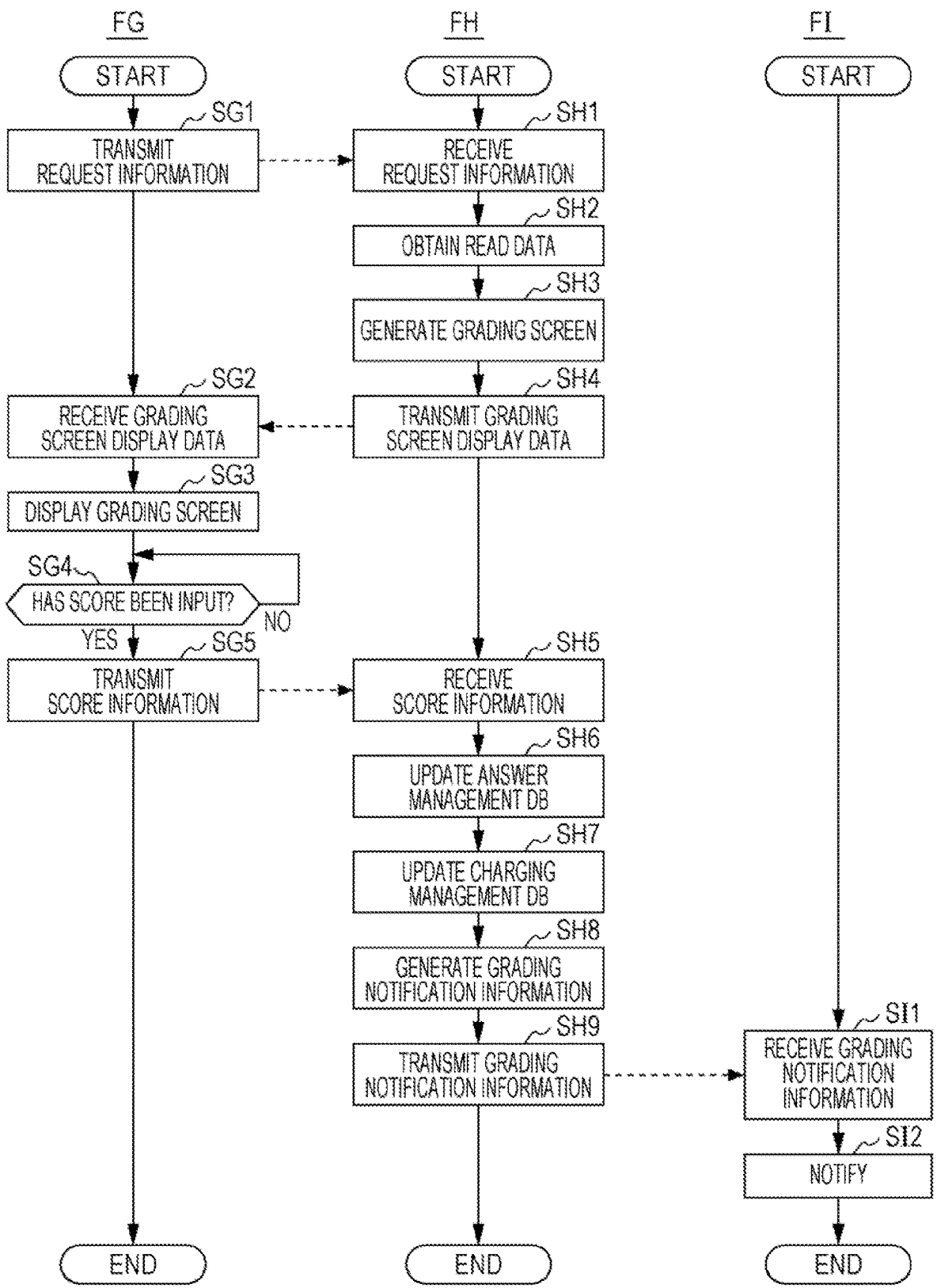

INFORMATION PROCESSING SYSTEM AND INFORMATION PROCESSING METHOD FOR TRANSMITTING, PRINTING AND SCANNING TEACHING MATERIAL CONTENT TO BE GRADED

The present application is based on, and claims priority from JP Application Serial Number 2020-089425, filed May 22, 2020, the disclosure of which is hereby incorporated by reference herein in its entirety.

BACKGROUND

1. Technical Field

The present disclosure relates to an information processing system and an information processing method.

2. Related Art

Systems concerning teaching material content are known in the related art. For example, JP-A-2004-333525 discloses a system including a server that delivers teaching material content to be used for a lecture to terminals of students.

Systems concerning teaching material content, such as the system disclosed in JP-A-2004-333525, include a system that generates printed material on which teaching material content is printed. However, in a related-art system of this kind, even when an answer is given on the printed material on which teaching material content is printed, no mechanisms are available for viewing the answer, grading the answer, and the like.

SUMMARY

According to an aspect of the present disclosure, there is provided an information processing system including a server and a printer configured to communicate with the server. The server transmits print instruction information instructing printing of teaching material content and answerer identification information identifying an answerer who answers the teaching material content. Upon receiving the print instruction information, the printer generates printed material on which the teaching material content and the answerer identification information are printed. The printer reads a print surface of the printed material filled with an answer given by the answerer and transmits read data corresponding to a read image. Upon receiving the read data, the server acquires the answerer identification information printed on the printed material from the received read data. The server performs processing for providing the read image for a terminal device of a person concerned having a predetermined relationship with the answerer indicated by the acquired answerer identification information.

According to another aspect of the present disclosure, there is provided an information processing method to be performed by a server and a printer configured to communicate with the server. The information processing method includes the server transmitting print instruction information instructing printing of teaching material content and answerer identification information identifying an answerer who answers the teaching material content; upon receiving the print instruction information, the printer generating printed material on which the teaching material content and the answerer identification information are printed; the printer reading a print surface of the printed material filled with an answer given by the answerer and transmitting read data corresponding to a read image; upon receiving the read data, the server acquiring the answerer identification information printed on the printed material from the received read data; and the server performing processing for providing the read image for a terminal device of a person concerned having a predetermined relationship with the answerer indicated by the acquired answerer identification information.

BRIEF DESCRIPTION OF THE DRAWINGS

FIG. 7 is a flowchart illustrating the operation of the information processing system.

DESCRIPTION OF EXEMPLARY EMBODIMENTS

Figure 1:
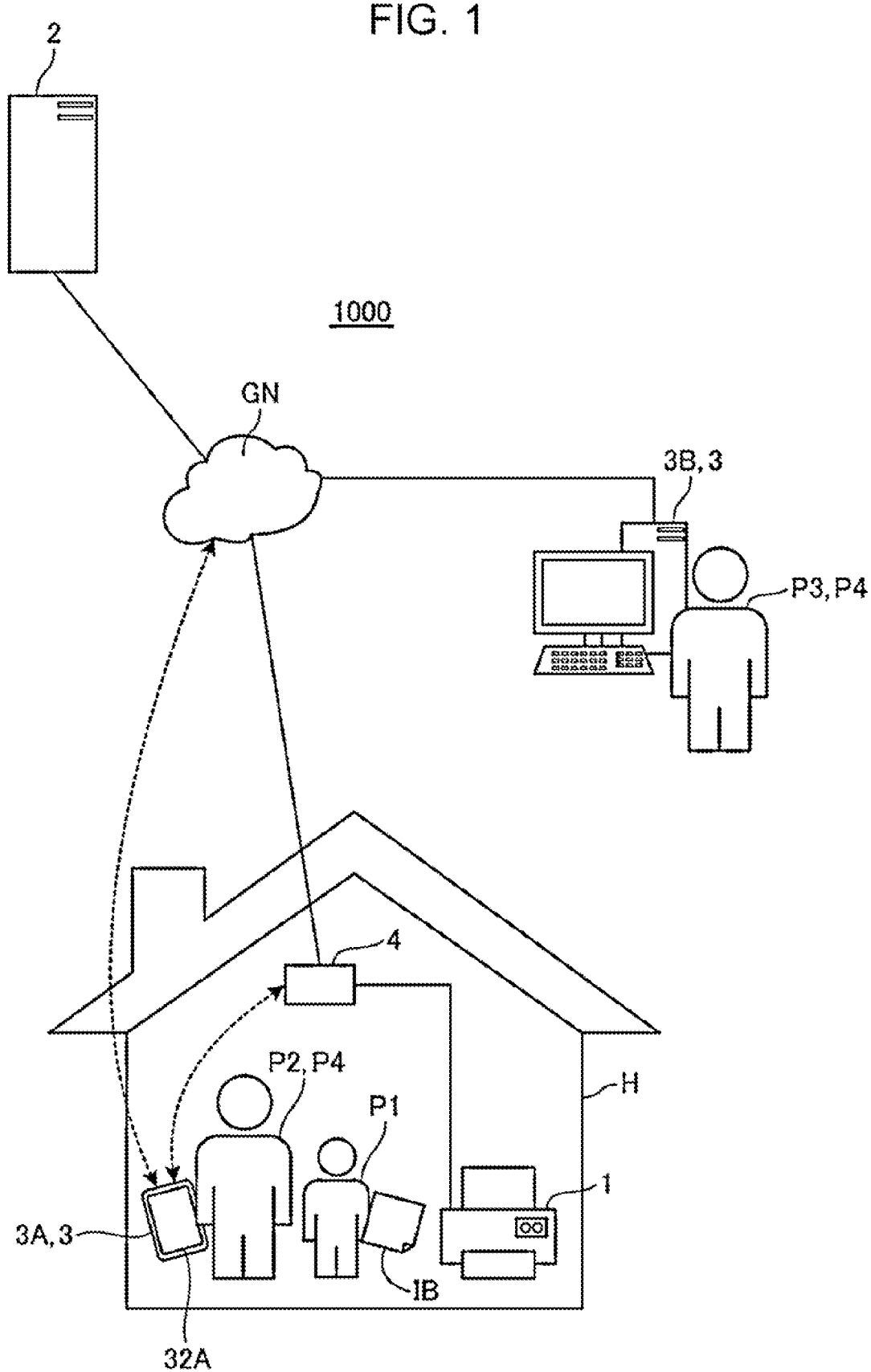
FIG. 1 is a diagram illustrating the configuration of an information processing system.

FIG. 1 is a diagram illustrating the configuration of an information processing system 1000.

The information processing system 1000 is a system that performs various kinds of information processing concerning teaching material content KC. The information processing system 1000 generates printed material on which teaching material content KC is printed by a multifunction machine 1 so as to provide an answerer P1 with the teaching material content KC. In the following description, printed material on which the teaching material content KC is printed is referred to as "teaching material content printed material" and denoted by "IB". The multifunction machine 1 corresponds to an example of the printer.

A purpose of the teaching material content KC according to the present embodiment is to enable the answerer P1 to learn through answering questions. In this regard, the teaching material content KC may be content that includes a question and enables answering of the question, or may be content that enables only answering. The latter content is content including only answer fields, such as an answer sheet having no questions.

In the present embodiment, for example, the answerer P1 is a child of a contractor P2. The contractor P2 is a person who has made a predetermined contract with an entity that grades answers made on the teaching material content printed material IB. In the following, the entity is referred to as a "grading entity". Grading entities include cram schools, grading companies that perform grading processing without conducting business concerning supplementary school education or preparatory education, and the like. The parent-child relationship between the contractor P2 and the answerer P1 corresponds to an example of the predetermined relationship.

The information processing system 1000 includes the multifunction machine 1. The multifunction machine 1 is referred to as a multifunction peripheral (MFP) and is an apparatus configured to perform various kinds of processing, such as printing, scanning, and the like. The multifunction machine 1 illustrated in FIG. 1 is disposed in a home H of the answerer P1. In this regard, the multifunction machine 1 may be an apparatus owned by the answerer P1 and/or the contractor P2, an apparatus that the answerer P1 and/or the contractor P2 has rented from a vendor who conducts rental business, or the like, or an apparatus lent by the grading entity to the answerer P1 and/or the contractor P2.

The multifunction machine 1 is coupled to a communication device 4 disposed in the home H and communicates with an information processing server 2 connected to a global network GN via the communication device 4. The global network GN includes the Internet, a telephone network, and other communication networks. The information processing server 2 corresponds to an example of the server.

The communication device 4 is connected to the global network GN and communicates with the information processing server 2 connected to the global network GN. The communication device 4 functions as an interface device for connecting the multifunction machine 1 to the global network GN. Also, when a contractor terminal 3A establishes a communication connection with the communication device 4, the communication device 4 functions as an interface device for connecting a terminal device 3 to the global network GN. The communication device 4 has functions such as a function related to a modem, a router function, a network address translation (NAT) function, and the like.

The information processing system 1000 includes the information processing server 2. The information processing server 2 is a server device that performs various kinds of information processing concerning the teaching material content KC. The information processing server 2 is connected to the global network GN and communicates with the multifunction machine 1 and the terminal device 3. In this regard, although the information processing server 2 in each diagram is expressed by one block, this does not necessarily mean that the information processing server 2 is constituted by a single server device. For example, the information processing server 2 may include a plurality of server devices having different processing content or a plurality of server devices having different databases.

The terminal device 3 includes a contractor terminal 3A and a grader terminal 3B. The contractor terminal 3A is a device used by the contractor P2. In the present embodiment, a tablet device having a touch panel 32A is illustrated as an example of the contractor terminal 3A. However, the contractor terminal 3A may be a device, such as a desktop device, a laptop device, a smartphone, or the like. When the contractor terminal 3A makes a communication connection with the communication device 4, the contractor terminal 3A communicates with the information processing server 2 via the communication device 4 and the global network GN, and when the contractor terminal 3A does not make a communication connection with the communication device 4, the contractor terminal 3A communicates with the information processing server 2 via the global network GN. In this regard, the contractor terminal 3A may be a device owned by the contractor P2, a device rented by the contractor P2 from a vendor who conducts rental business, or the like, or a device that the grading entity has lent to the contractor P2.

The grader terminal 3B is a device used by a grader P3 who belongs to a grading entity. The grader P3 is a person who belongs to the grading entity, and for example, when the grading entity is a cram school, the grader P3 is a cram school teacher. The grader P3 has a relationship with the answerer P1 for grading the answer given by the answerer P1. This relationship corresponds to an example of the predetermined relationship. In the following description, when the contractor P2 and the grader P3 are generically named without distinguishing them, they are referred to as "persons concerned" who have a predetermined relationship with the answerer P1 and denoted by "P4".

In the present embodiment, a desktop device is illustrated as an example of the grader terminal 3B. However, the grader terminal 3B may be a device, such as a tablet device, a laptop device, a smartphone, or the like. The grader terminal 3B establishes a communication connection with the global network GN and communicates with the information processing server 2 via the global network GN. In this regard, the grader terminal 3B may be a device owned by the grader P3, a device rented by the grader P3 from a vendor who conducts rental business, or the like, or a device that the grading entity has lent to the grader P3.

In this regard, in the present embodiment, the number of multifunction machines 1 included in the information processing system 1000 is not limited and may be plural. In the case of including a plurality of multifunction machines 1, each of the plurality of multifunction machines 1 may be disposed in a respective home H of an answerer P1. Also, similarly to the multifunction machines 1, the number of the contractor terminals 3A and the grader terminals 3B that are included in the information processing system 1000 is not limited and may be plural.

Figure 2:
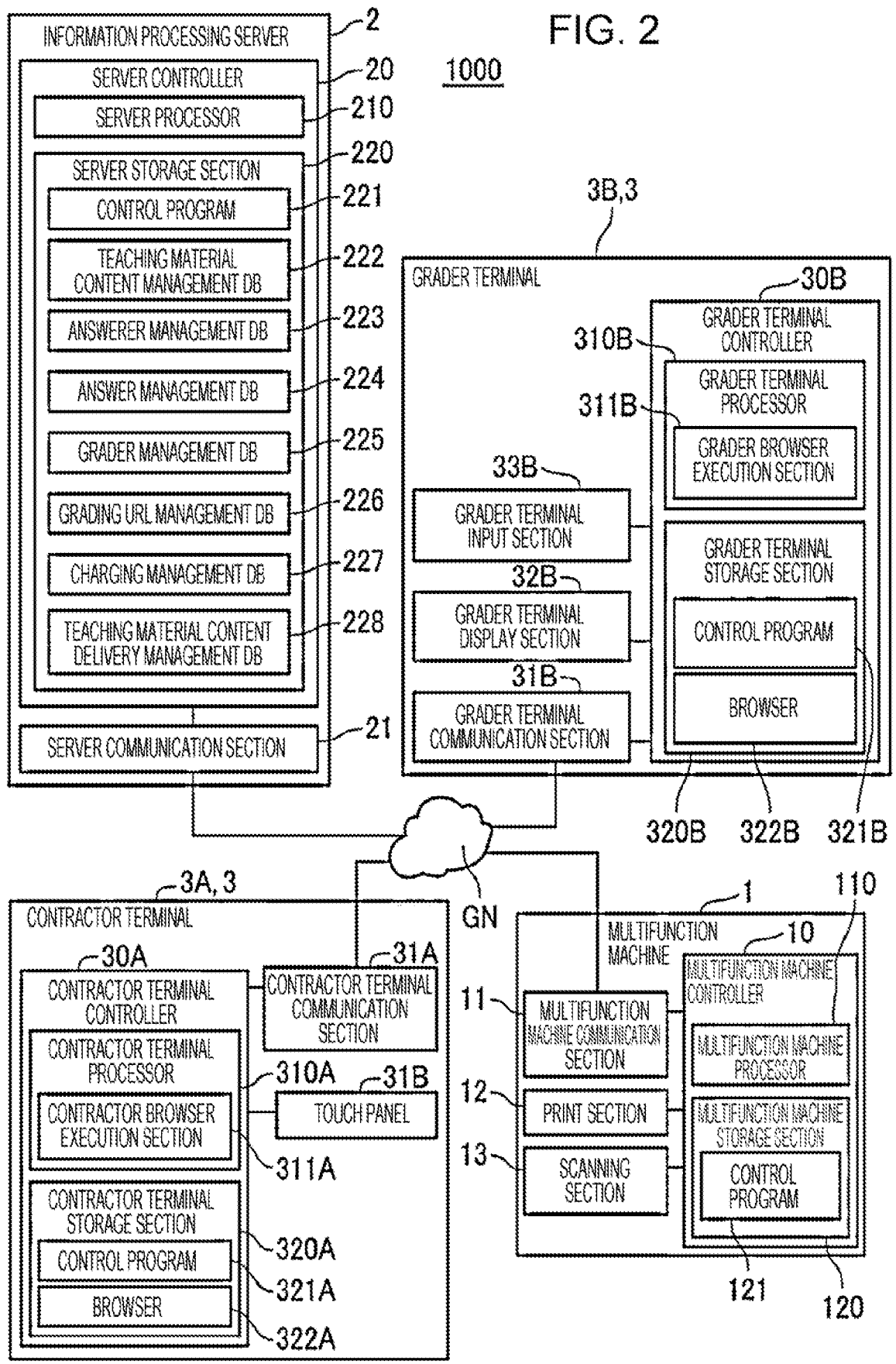
FIG. 2 is a block diagram illustrating the functional configurations of individual devices in the information processing system.

FIG. 2 is a diagram illustrating the functional configurations of the individual devices in the information processing system 1000.

First, a description will be given of the multifunction machine 1. The multifunction machine 1 includes a multifunction machine controller 10, a multifunction machine communication section 11, a print section 12, and a scanning section 13.

The multifunction machine controller 10 includes a multifunction machine processor 110, which is a processor that executes a program, such as a CPU, an MPU, or the like, and a multifunction machine storage section 120 and controls each section of the multifunction machine 1. In the multifunction machine controller 10, the multifunction machine processor 110 performs various kinds of processing by cooperation of hardware with software so as to read a control program 121 stored in the multifunction machine storage section 120 and perform processing.

The multifunction machine storage section 120 includes a storage area that stores a program to be executed by the multifunction machine processor 110 and data processed by the multifunction machine processor 110. The multifunction machine storage section 120 stores the control program 121 executed by the multifunction machine processor 110 and other various data. The multifunction machine storage section 120 includes a nonvolatile storage area that stores a program and data in a nonvolatile manner. Also, the multifunction machine storage section 120 may include a volatile storage area and form a work area for temporarily storing a program to be executed by the multifunction machine processor 110 and for processing target data.

The multifunction machine communication section 11 includes communication hardware conforming to a predetermined communication standard and communicates with the information processing server 2 in accordance with a predetermined communication standard under the control of the multifunction machine controller 10.

The print section 12 includes components concerning printing, such as an ink jet head that discharges ink onto a print medium to form a dot, a carriage that operates the ink jet head in the scanning direction, a carriage drive motor that drives the carriage, a transport unit that transports the print medium, an ink supply unit that supplies ink to the ink jet head, and the like. The print section 12 discharges ink from a nozzle of the ink jet head to form a dot on the print surface of the print medium under the control of the multifunction machine controller 10 to perform printing on the print medium.

The scanning section 13 includes components concerning reading by a scanner that reads characters and images recorded on a document, and the like. The scanning section 13 reads, for example, recorded characters and images by irradiating the target to be read with light emitted from a light source and outputs the image data obtained by reading to the multifunction machine controller 10. The multifunction machine controller 10 performs data processing, such as RGB conversion and compression processing, and the like on the image data input from the scanning section 13 to generate data in a predetermined format. The multifunction machine controller 10 stores the generated predetermined format data in the multifunction machine storage section 120 as read data 2241.

Next, a description will be given of the contractor terminal 3A. The contractor terminal 3A includes a contractor terminal controller 30A, a contractor terminal communication section 31A, and a touch panel 32A.

The contractor terminal controller 30A includes a contractor terminal processor 310A, which is a processor that executes a program, such as a CPU, an MPU, or the like, and a contractor terminal storage section 320A and controls each section of the contractor terminal 3A. In the contractor terminal controller 30A, the contractor terminal processor 310A performs various kinds of processing by cooperation of hardware with software so as to read a control program 321A stored in the contractor terminal storage section 320A and perform processing. Also, the contractor terminal controller 30A functions as a contractor browser execution section 311A through the contractor terminal processor 310A executing a browser 322A stored in the contractor terminal storage section 320A.

The contractor terminal storage section 320A includes a storage area that stores a program to be executed by the contractor terminal processor 310A and data processed by the contractor terminal processor 310A. The contractor terminal storage section 320A stores the control program 321A and the browser 322A that are executed by the contractor terminal processor 310A and other various kinds of data. The contractor terminal storage section 320A includes a nonvolatile storage area that stores a program and data in a nonvolatile manner. Also, the contractor terminal storage section 320A may include a volatile storage area and form a work area for temporarily storing a program to be executed by the contractor terminal processor 310A and for processing target data.

The contractor terminal communication section 31A includes communication hardware conforming to a predetermined communication standard and communicates with the information processing server 2 in accordance with a predetermined communication standard under the control of the contractor terminal controller 30A.

The touch panel 32A includes a display panel, such as a liquid crystal display panel, or the like, and a touch sensor overlaid on the display panel or disposed integrally with the display panel. The display panel displays various images under the control of the contractor terminal controller 30A. The touch sensor detects a touch operation and outputs the touch operation to the contractor terminal controller 30A.

The contractor terminal controller 30A performs processing corresponding to the touch operation in accordance with the input from the touch sensor.

Next, a description will be given of the grader terminal 3B. The grader terminal 3B includes a grader terminal controller 30B, a grader terminal communication section 31B, a grader terminal display section 32B, and a grader terminal input section 33B.

The grader terminal controller 30B includes a grader terminal processor 310B, which is a processor that executes a program, such as a CPU, an MPU, or the like, and a grader terminal storage section 320B and controls each section of the grader terminal 3B. In the grader terminal controller 30B, the grader terminal processor 310B performs various kinds of processing by cooperation of hardware with software so as to read a control program 321B stored in the grader terminal storage section 320B and perform processing. Also, the grader terminal controller 30B functions as a grader browser execution section 311B through the grader terminal processor 310B executing a browser 322B stored in the grader terminal storage section 320B.

The grader terminal storage section 320B includes a storage area that stores a program to be executed by the grader terminal processor 310B and data processed by the grader terminal processor 310B. The grader terminal storage section 320B stores the control program 321B and the browser 322B that are executed by the grader terminal processor 310B and other various kinds of data. The grader terminal storage section 320B includes a nonvolatile storage area that stores a program and data in a nonvolatile manner. Also, the grader terminal storage section 320B may include a volatile storage area and form a work area for temporarily storing a program to be executed by the grader terminal processor 310B and for processing target data.

The grader terminal communication section 31B includes communication hardware conforming to a predetermined communication standard and communicates with the information processing server 2 in accordance with a predetermined communication standard under the control of the grader terminal controller 30B.

The grader terminal display section 32B includes an LED, a display panel, and the like and, for example, turns on, blinks, and turns off the LED in a predetermined manner and displays information on the display panel under the control of the grader terminal controller 30B.

The grader terminal input section 33B includes an operation switch disposed on the grader terminal 3B and an input mechanism, such as a touch panel, a mouse, a keyboard, and the like, detects an operation on the input mechanism of the grader P3, and outputs a detection result to the grader terminal controller 30B. The grader terminal controller 30B performs processing corresponding to the operation on the input mechanism in accordance with the input from the grader terminal input section 33B.

Next, a description will be given of the information processing server 2. The information processing server 2 includes a server controller 20 and a server communication section 21.

The server controller 20 includes a server processor 210, which is a processor that executes a program, such as a CPU, an MPU, or the like, and a server storage section 220 and controls each section of the information processing server 2. In the server controller 20, the server processor 210 performs various kinds of processing by cooperation of hardware with software so as to read a control program 221 stored in the server storage section 220 and perform processing.

The server storage section 220 includes a storage area that stores a program to be executed by the server processor 210 and data processed by the server processor 210. The server storage section 220 stores a control program 221 that is executed by the server processor 210, a teaching material content management DB 222, an answerer management DB 223, an answer management DB 224, a grader management DB 225, a grading URL management DB 226, a charging management DB 227, a teaching material content delivery management DB 228, and other various kinds of data. The server storage section 220 includes a nonvolatile storage area that stores a program and data in a nonvolatile manner. Also, the server storage section 220 may include a volatile storage area and form a work area for temporarily storing a program to be executed by the server processor 210 and for processing target data.

Figure 3:
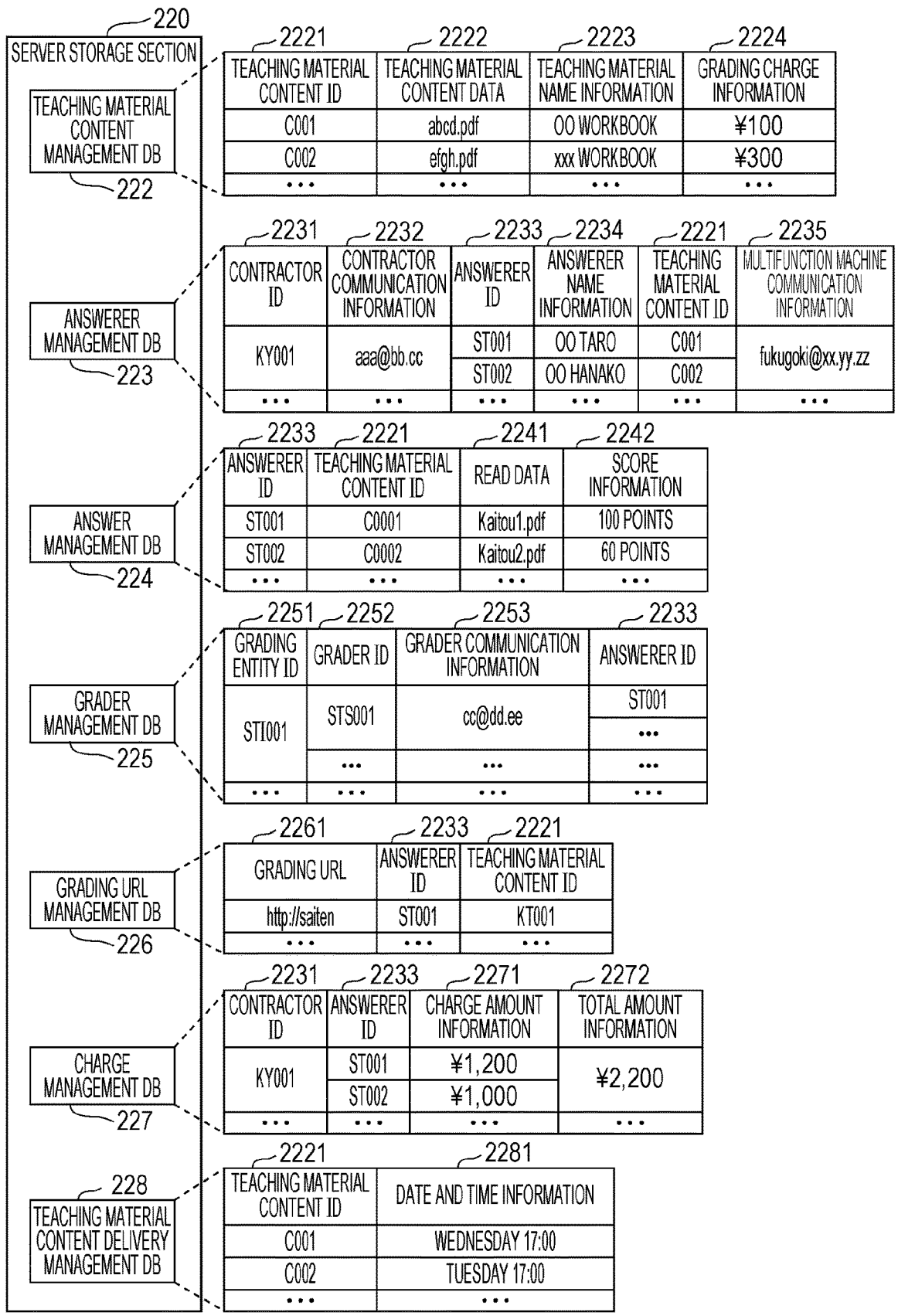
FIG. 3 is a diagram illustrating an example of individual databases stored in a server storage section.

FIG. 3 is a diagram illustrating an example of individual databases stored in the server storage section 220.

The teaching material content management DB 222 is a database for managing information concerning teaching material content KC. The DB includes records each including a teaching material content ID 2221, teaching material content data 2222, teaching material name information 2223, and grading charge information 2224. A teaching material content ID 2221 corresponds to an example of the teaching material content identification information.

A teaching material content ID 2221 is identification information for identifying teaching material content KC. A teaching material content ID 2221 is assigned to each teaching material content KC in advance.

Teaching material content data 2222 is image data of the teaching material content KC identified by a teaching material content ID 2221. In FIG. 3, PDF (Portable Document Format) is illustrated as an example of the data format of the teaching material content data 2222. However, the data format of the teaching material content data 2222 is not limited to the PDF format, and may be a JPEG format or other formats.

Teaching material name information 2223 is information indicating a name of the teaching material in which the teaching material content KC identified by the teaching material content ID 2221 is recorded. For example, when the teaching material content KC identified by the teaching material content ID 2221 is content of a page recorded in the teaching material of "00 workbook", the name of the teaching material indicated by the teaching material name information 2223 is "00 workbook".

Grading charge information 2224 is information indicating fees charged for the grader P3 grading the answer given to the teaching material content KC identified by the teaching material content ID 2221. In this regard, the grading charge indicated by the grading charge information 2224 may differ in accordance with the content of the teaching material content KC, the subject of the teaching material content KC, such as Japanese language, mathematics, and the like, the school grades targeted by the teaching material content KC, such as lower grades of elementary school, first year of high school, and the like.

The answerer management DB 223 is a database for managing information concerning the answerer P1. The answerer management DB 223 includes records each including a contractor ID 2231, contractor communication information 2232, an answerer ID 2233, answerer name information 2234, a teaching material content ID 2221, and multifunction machine communication information 2235. An answerer ID 2233 corresponds to an example of the answerer identification information.

A contractor ID 2231 is identification information for identifying a contractor P2. A contractor ID 2231 is suitably assigned to each contractor P2 in advance.

Contractor communication information 2232 is information for transmitting information to an email address or the like of the contractor terminal 3A.

An answerer ID 2233 is identification information for identifying an answerer P1. The answerer management DB 223 includes records each including one or more answerer IDs 2233. An answerer ID 2233 is suitably assigned to each answerer P1 in advance.

A teaching material content ID 2221 included in a record of the answerer management DB 223 is the teaching material content ID 2221 of teaching material content KC to be provided to the answerer P1 on a subsequent occasion. A teaching material content ID 2221 included in a record of the answerer management DB 223 is suitably updated by the server controller 20.

Multifunction machine communication information 2235 is information for communicating with the multifunction machine 1. For example, when an individual email address is assigned to a multifunction machine 1, multifunction machine communication information 2235 is information indicating the email address.

The answer management DB 224 is a database for managing the information concerning an answer of an answerer P1. The answer management DB 224 includes records each including an answerer ID 2233, a teaching material content ID 2221, read data 2241, and score information 2242.

Score information 2242 is information indicating a score that a grader P3 has given to an answer to the teaching material content KC identified by a teaching material content ID 2221 associated in the same record.

The grader management DB 225 is a database for managing information concerning a grader P3. The grader management DB 225 includes a grading entity ID 2251, a grader ID 2252, grader communication information 2243, and an answerer ID 2233.

A grading entity ID 2251 is identification information for identifying a grading entity to which a grader P3 belongs. A grading entity ID 2251 is suitably assigned to each grading entity in advance.

A grader ID 2252 is identification information for identifying a grader P3. A grader ID 2252 is suitably assigned to each grader P3 in advance.

Grader communication information 2253 is information, such as an email address or the like, for transmitting information to a grader terminal 3B.

The grader management DB 225 includes records each including one or more answerer IDs 2233.

The grading URL management DB 226 is a database for managing information concerning a grading URL, which is a URL used by a grader P3 for performing grading. The grading URL management DB 226 includes records each including a grading URL 2261, an answerer ID 2233, and a teaching material content ID 2221. A grading URL 2261 corresponds to an example of the acquisition information.

The charging management DB 227 is a database for managing information concerning a charge amount to be charged to a contractor P2 for grading by a grader P3. The charging management DB 227 includes records each including a contractor ID 2231, an answerer ID 2233, charge amount information 2271, and total amount information 2272.

Charge amount information 2271 is information indicating a charge amount for each answerer P1. In the charging management DB 227 records, the charge amount information 2271 is associated with the answerer ID 2233 on one-to-one basis. Charge amount information 2271 corresponds to an example of the fee information.

Total amount information 2272 is information indicating the total of the charge amounts that the information processing server 2 charges a contractor P2 for grading by a grader P3. In the charging management DB 227, the total amount information 2272 indicates the total of the charge amounts of the associated charge amount information 2271.

The server controller 20 charges the contractor P2 the total of the charge amounts indicated by the total amount information 2272 associated with the contractor ID 2231 for each contractor P2 by using a predetermined method at a predetermined timing. When the charged total amount is paid by the contractor P2, the charge amounts indicated by the charge amount information 2271 and the total amount information 2272 that are associated with the contractor ID 2231 of the contractor P2 who has paid the charged total amount are set to 0 by the server controller 20.

The teaching material content delivery management DB 228 is a database for managing information concerning delivery of teaching material content. The teaching material content delivery management DB 228 includes records each including a teaching material content ID 2221 and date and time information 2281.

The date and time information 2281 is information indicating the date and time when the teaching material content KC is provided. The teaching material content delivery management DB 228 includes records each including date and time information 2281 for each teaching material content ID 2221.

Referring back to FIG. 2, the server communication section 21 includes communication hardware conforming to a predetermined communication standard and communicates with the multifunction machine 1 and the terminal device 3 under the control of the server controller 20.

Next, a description will be given of the operation of the information processing system 1000. First, a description will be given of the operation prior to the multifunction machine 1 generating teaching material content printed material IB.

Figure 4:
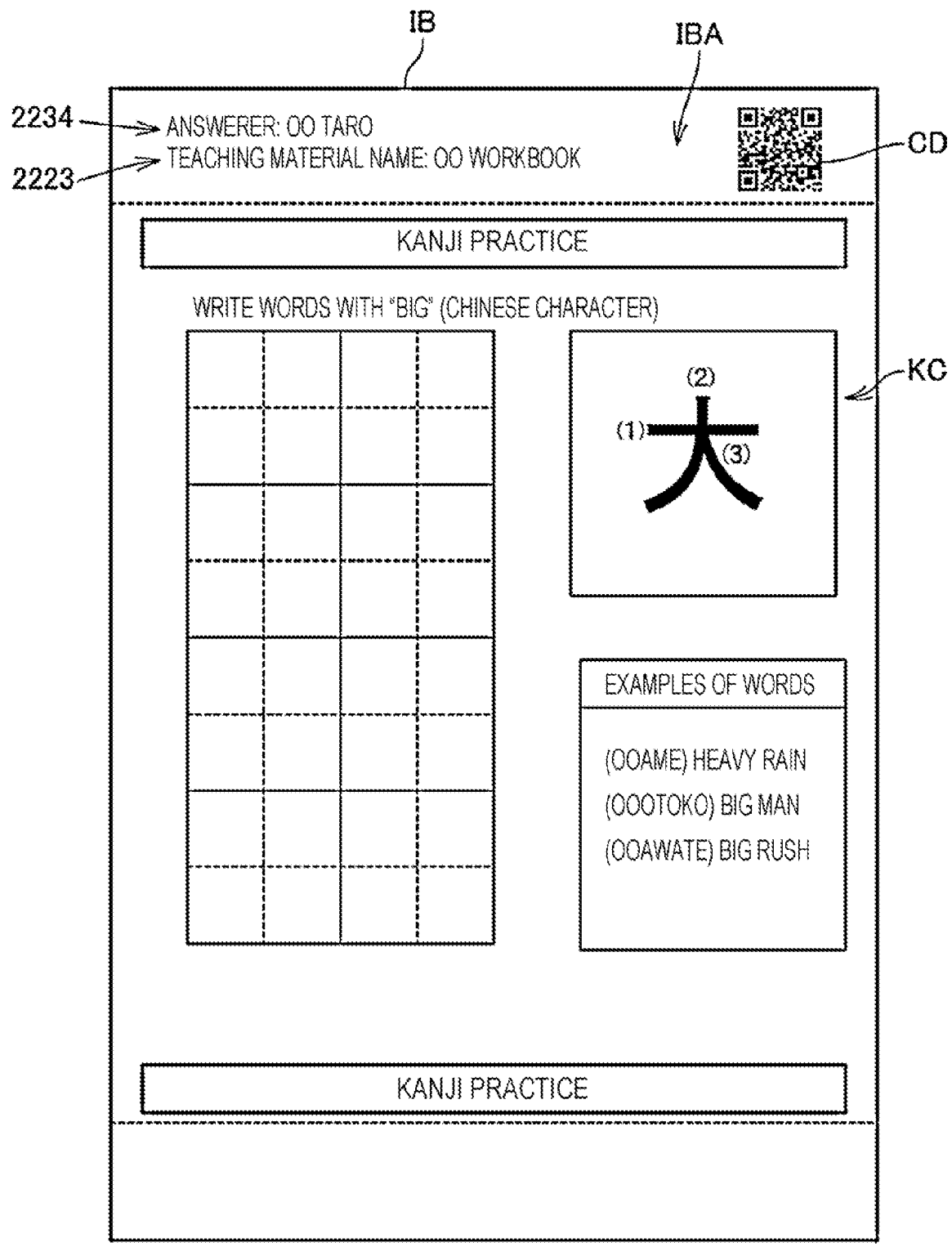
FIG. 4 is a diagram illustrating an example of the print content of teaching material content printed material.

Here, a description will be given of the print content of teaching material content printed material IB before the description of the operation. FIG. 4 is a diagram illustrating an example of the print content of teaching material content printed material IB.

On a print surface IBA of the teaching material content printed material IB, the teaching material content KC is printed based on the teaching material content data 2222. In the example in FIG. 4, the teaching material content KC printed on the print surface IBA of the teaching material content printed material IB includes a question and an answer field concerning a Chinese character corresponding to "big".

On the upper left side of the print surface IBA of the teaching material content printed material IB, answerer name information 2234 and teaching material name information 2223 are printed. On the upper right side of the print surface IBA, a code CD, such as a QR code, a barcode, or the like, is printed. Note that "QR Code" is a registered trademark. In FIG. 4, a QR code is illustrated as an example of a code CD.

The answerer name information 2234 printed on the print surface IBA of the teaching material content printed material IB indicates the name of the answerer P1 who should answer the question included in the teaching material content KC printed at the same time.

Also, the teaching material name information 2223 printed on the print surface IBA of the teaching material content printed material IB indicates the name of the teaching material containing the teaching material content KC printed at the same time.

Also, a code CD printed on the print surface IBA of the teaching material content printed material IB represents an answerer ID 2233 of the answerer P1 indicated by the answerer name information 2234 printed at the same time, a teaching material content ID 2221 of the teaching material content KC printed together, and a grading URL 2261. In this regard, printing a code CD on the teaching material content printed material IB corresponds to printing an answerer ID 2233, a teaching material content ID 2221, and a grading URL 2261 on the teaching material content printed material IB.

In this regard, the position in which answerer name information 2234, teaching material name information 2223, and a code CD are printed is not limited to the upper part of the teaching material content KC and may be in the lower part, on the right side, or on the left side. Also, on the print surface IBA of the teaching material content printed material IB, in addition to answerer name information 2234, teaching material name information 2223, and a code CD, other information, such as information concerning the copyright of the teaching material content KC, and the like may be printed.

Figure 5:
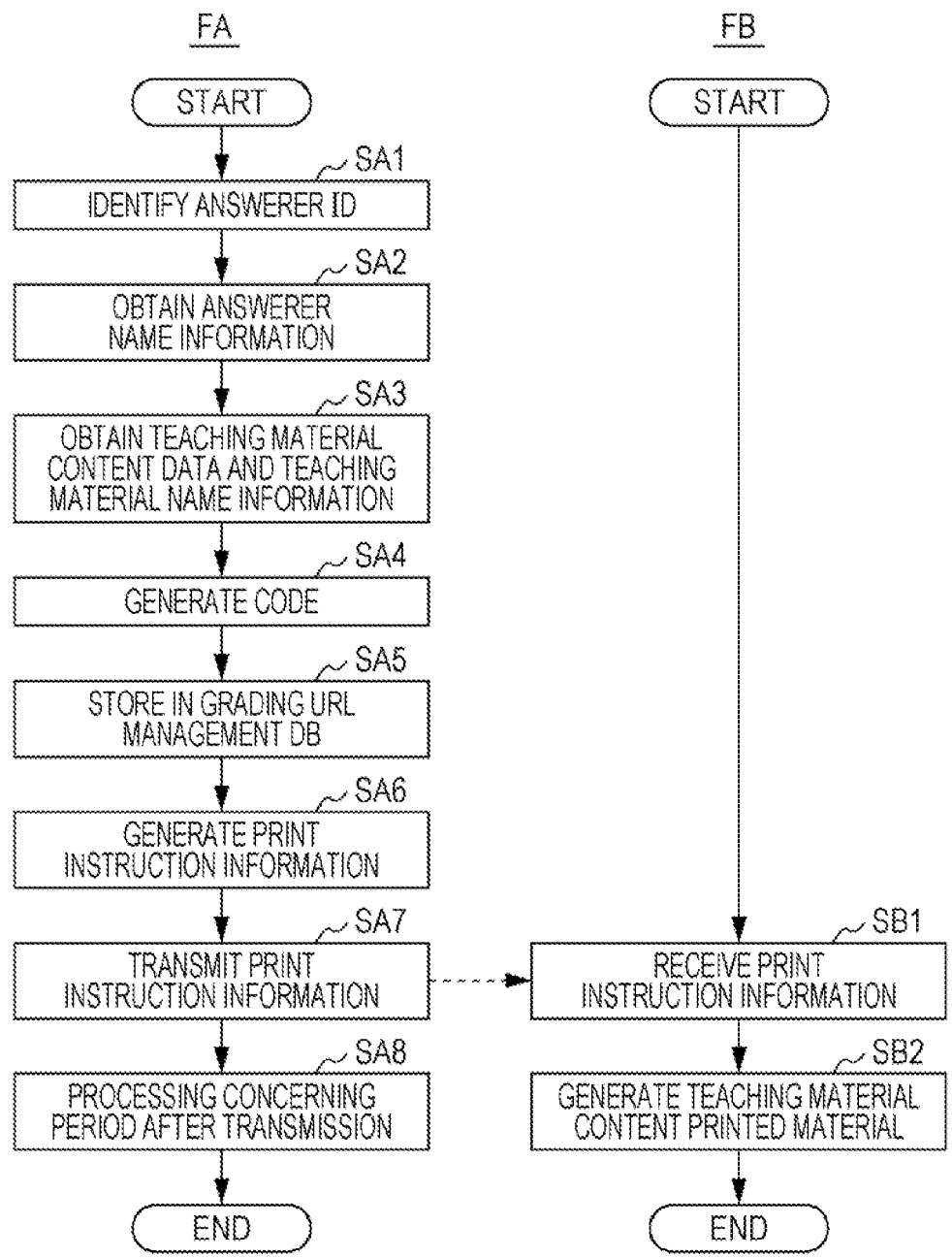
FIG. 5 is a flowchart illustrating the operation of the information processing system.

FIG. 5 is a flowchart illustrating the operation of the information processing system 1000. In FIG. 5, flowchart FA illustrates the operation of the information processing server 2, and flowchart FB illustrates the operation of the multifunction machine 1.

The server controller 20 of the information processing server 2 refers to the teaching material content delivery management DB 228, identifies a teaching material content ID 2221 associated with the date and time information 2281 indicating the current date and time, refers to the answerer management DB 223, and identifies an answerer ID 2233 associated with the teaching material content ID 221 (step SA1).

Next, the server controller 20 refers to the answerer management DB 223 and obtains answerer name information 2234 associated with the answerer ID 2233 identified in step SA1 (step SA2).

Next, the server controller 20 refers to the teaching material content management DB 222 and obtains the teaching material content data 2222 and the teaching material name information 2223 that are identified by the teaching material content ID 2221 associated with the answerer ID 2233 identified in step SA1 (step SA3).

Next, the server controller 20 generates a code CD that indicates the answerer ID 2233 obtained in step SA1, a teaching material content ID 2221 associated with the answerer ID 2233, and a grading URL 2261 for grading the answer to the teaching material content KC indicated by the teaching material content ID 2221 (step SA4).

Next, the server controller 20 stores a record including the answerer ID 2233 indicated by the code CD generated in step SA4, the teaching material content ID 2221, and the grading URL 2261 in the grading URL management DB 226 (step SA5).

Next, the server controller 20 generates print instruction information (step SA6). The print instruction information is information that instructs printing of the answerer name information 2234 obtained in step SA2, the teaching material content KC indicated by the teaching material content data 2222 obtained in step SA3, the teaching material name information 2223 obtained in step SA3, and the code CD generated in step SA4. The print instruction information includes various control commands related to printing and conforming to the command system of the multifunction machine 1.

Next, the server controller 20 transmits, by using the server communication section 21, the generated print instruction information to a multifunction machine 1 disposed in a home H of the answerer P1 indicated by the answerer ID 2233 based on the multifunction machine communication information 2235 associated with the answerer ID 2233 identified in step SA1 (step SA7).

Next, after the server controller 20 transmits the print instruction information to the multifunction machine 1, the server controller 20 performs processing concerning a period after transmission of the print instruction information (step SA8). For example, the server controller 20 refers to the answerer management DB 223 in step SA8 and updates the teaching material content ID 2221 associated with the answerer ID 2233 identified in step SA1 to another teaching material content ID 2221. Thereby, it is possible for the server controller 20 to change teaching material content KC to be provided to the same answerer P1 on a subsequent occasion.

Referring to flowchart FB, the multifunction machine controller 10 of the multifunction machine 1 receives print instruction information from the information processing server 2 through the multifunction machine communication section 11 (step SB1).

Next, the multifunction machine controller 10 performs printing by using the print section 12 in accordance with the print instruction information received from the information processing server 2 to generate teaching material content printed material IB (step SB2).

Next, a description will be given of the operation of the information processing system 1000 when the multifunction machine 1 reads answered teaching material content printed material IB produced by writing an answer on the teaching material content printed material IB generated by the multifunction machine 1.

Figure 6:
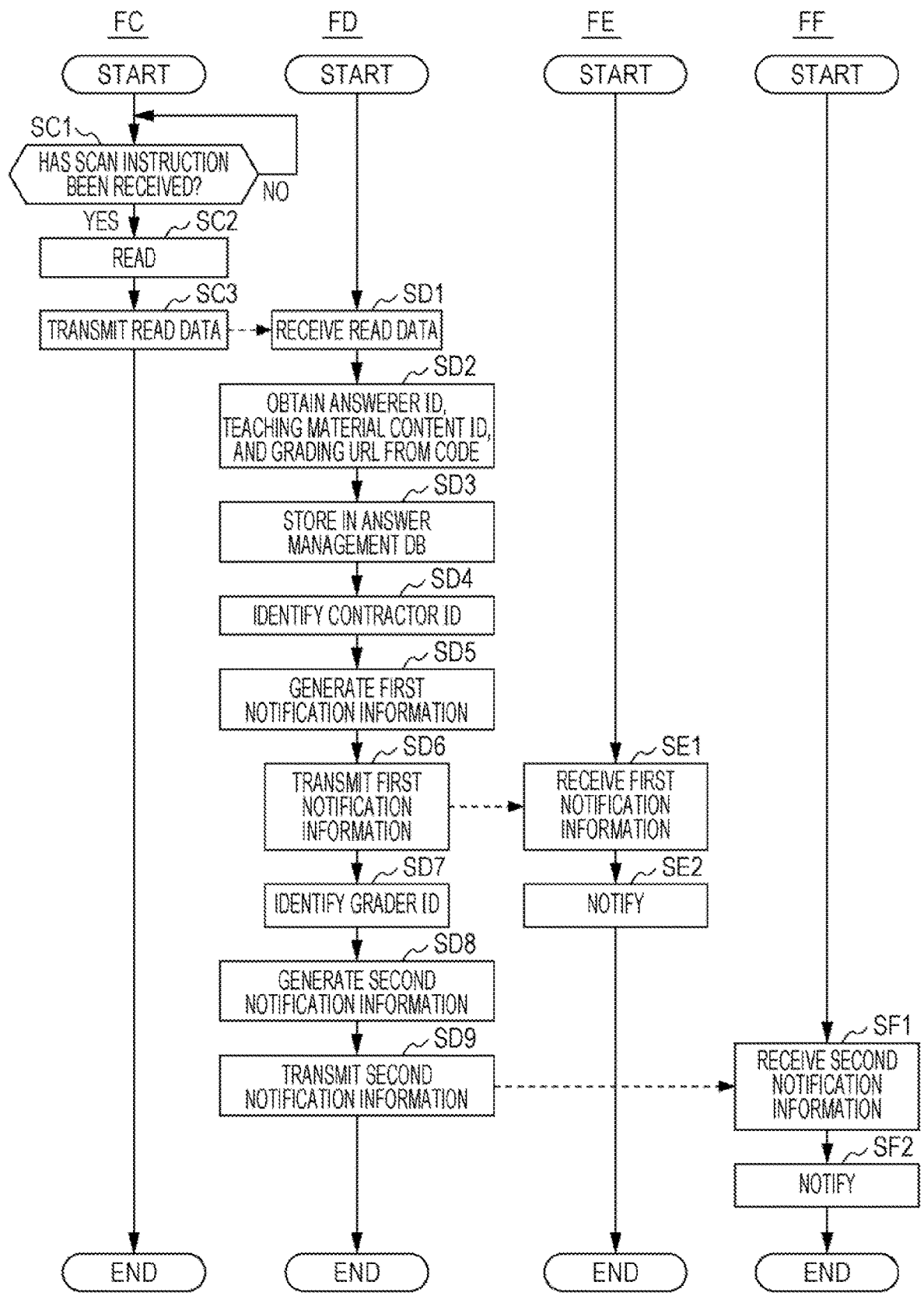
FIG. 6 is a flowchart illustrating the operation of the information processing system.

FIG. 6 is a flowchart illustrating the operation of the information processing system 1000. In FIG. 6, flowchart FC illustrates the operation of the multifunction machine 1, flowchart FD illustrates the operation of the information processing server 2, flowchart FE illustrates the operation of the contractor terminal 3A, and flowchart FF illustrates the operation of the grader terminal 3B.

In this regard, at a time corresponding to the start of flowchart FC illustrated in FIG. 6, it is assumed that teaching material content printed material IB on which an answer has been written by an answerer P1 is set in the multifunction machine 1.

The multifunction machine controller 10 of the multifunction machine 1 determines whether or not a scan instruction has been received (step SC1).

When the multifunction machine controller 10 determines that a scan instruction has been received (step SC1: YES), the multifunction machine controller 10 reads the print surface IBA of the set teaching material content printed material IB by using the scanning section 13 (step SC2). In this regard, the read data 2241 is stored in the multifunction machine storage section 120.

The multifunction machine controller 10 obtains the read data 2241 from the multifunction machine storage section 120 and transmits the obtained read data 2241 to the information processing server 2 by using the multifunction machine communication section 11 (step SC3).

As illustrated in flowchart FD, the server controller 20 of the information processing server 2 receives the read data 2241 from the multifunction machine 1 by using the server communication section 21 (step SD1).

Next, the server controller 20 obtains an answerer ID 2233, a teaching material content ID 2221, and grading URL information 2261 from the code CD included in the image of the print surface IBA of the teaching material content printed material IB indicated by the received read data 2241 (step SD2). Hereinafter the image of the print surface IBA of the teaching material content printed material IB indicated by the read data 2241 is referred to as a "read image".

Next, the server controller 20 stores the read data 2241 received in step SD1, the answerer ID 2233 obtained in step SD2, and the teaching material content ID 2221 obtained in step SD2 in the answer management DB 224 (step SD3).

In step SD3, the server controller 20 generates a record including the read data 2241 received in step SD1, the answerer ID 2233 obtained in step SD2, the teaching material content ID 2221 obtained in step SD2, and blank score information 2242. The server controller 20 stores the generated record in the answer management DB 224.

Next, the server controller 20 refers to the answerer management DB 223 and identifies a contractor ID 2231 associated with the answerer ID 2233 obtained in step SD2 (step SD4).

Next, the server controller 20 generates first answer notification information providing notification that an answer has been given (step SD5). First answer notification information corresponds to an example of the answer notification information. The first answer notification information includes a display URL, which is a URL concerning the display of the read image indicated by the read data 2241 received in step SD1, and answerer name information 2234 identified by the answerer ID 2233 obtained in step SD2. The display URL corresponds to an example of the acquisition information. In this regard, first answer notification information may be information including at least a display URL.

Next, when the server controller 20 generates first answer notification information, the server controller 20 transmits the generated first answer notification information to the contractor terminal 3A by using the server communication section 21 based on the contractor communication information 2232 identified by the contractor ID 2231 identified in step SD4 (step SD6).

As illustrated in flowchart FE, the contractor terminal 3A receives the first answer notification information by using the contractor terminal communication section 31A (step SE1).

Next, the contractor terminal 3A provides notification of the answerer name information 2234 included in the first answer notification information based on the received first answer notification information and that an answer has been given to the teaching material content printed material IB by using the touch panel 32A (step SE2). In this regard, in step SE2, the contractor terminal 3A may provide notification of the display URL information included in the first answer notification information together.

In this manner, when the contractor terminal 3A receives the first answer notification information, the contractor terminal 3A provides notification that the answerer P1 has given an answer to the teaching material content printed material IB. Accordingly, it is possible for the contractor P2 to recognize that an answerer P1, who is his or her child, has answered the teaching material content KC. Also, since the first answer notification information includes a display URL, the contractor browser execution section 311A of the contractor terminal 3A accesses the display URL based on the operation of the contractor P2 so as to enable the read image to be displayed on the touch panel 32A. Thereby, it is possible for the contractor P2 to view the answer given by the answerer P1 to teaching material content printed material IB by using the contractor terminal 3A.

Referring to flowchart FD, the server controller 20 refers to the grader management DB 225 and identifies a grader ID 2252 associated with the answerer ID 2233 obtained in step SD2 (step SD7).

Next, the server controller 20 generates second answer notification information providing notification that an answer has been given (step SD8). The second answer notification information corresponds to an example of the answer notification information. The second answer notification information includes the grading URL 2261 obtained in step SD2 and the answerer name information 2234 identified by the answerer ID 2233 obtained in step SD2. In this regard, the second answer notification information may be information including at least a grading URL 2261.

Next, when the server controller 20 generates second answer notification information, the server controller 20 transmits the generated second answer notification information to the grader terminal 3B by using the server communication section 21 in accordance with the grader communication information 2253 identified by the grader ID 2252 identified in step SD7 (step SD9).

As illustrated in flowchart FF, the grader terminal controller 30B receives second answer notification information by using the grader terminal communication section 31B (step SF1).

Next, the grader terminal controller 30B provides notification that an answer has been given to the teaching material content printed material IB together with the answerer name information 2234 included in the second answer notification information by using the grader terminal display section 32B in accordance with the received second answer notification information (step SF2). In step SF2, the grader terminal controller 30B may provide notification of a grading URL 2261 included in the second answer notification information.

In this manner, when the grader terminal 3B receives second answer notification information, the grader terminal 3B provides notification that the answerer P1 has given an answer to the teaching material content printed material IB, and thus it is possible for the grader P3 to recognize that the answerer P1 has answered the teaching material content KC.

Next, a description will be given of the operation of the information processing system 1000 concerning the grading by the grader P3.

FIG. 7 is a flowchart illustrating the operation of the information processing system 1000. In FIG. 7, flowchart FG illustrates the operation of the grader terminal 3B, flowchart FH illustrates the operation of the information processing server 2, and flowchart FI illustrates the operation of the contractor terminal 3A.

The grader browser execution section 311B of the grader terminal 3B transmits, to the information processing server 2, request information that requests grading screen display data, which is data for displaying a grading screen with a grading URL 2261 included in the received second answer notification information as a destination (step SG1). In this regard, in step SG1, the request information is transmitted to the information processing server 2 as an HTTP request.

Referring to flowchart FH, the server controller 20 of the information processing server 2 receives request information by using the server communication section 21 (step SH1).

Next, the server controller 20 obtains the read data 2241 corresponding to the grading URL 2261 accessed by the grader terminal 3B (step SH2).

Here, a detailed description will be given of step SH2. The server controller 20 refers to the grading URL management DB 226 and obtains a combination of the answerer ID 2233 identified by the grading URL 2261 accessed by the grader terminal 3B and the teaching material content ID 2221. The server controller 20 refers to the answer management DB 224 and obtains the read data 2241 associated with the obtained combination.

Next, the server controller 20 generates a grading screen including the read image indicated by the obtained read data 2241 (step SH3).

The server controller 20 transmits the grading screen display data for displaying the generated grading screen to the grader terminal 3B as an HTTP response by using the server communication section 21 (step SH4). The grading screen display data transmitted in step SH4 includes the answerer ID 2233 and the teaching material content ID 2221 that are associated with the read data 2241 from the answer management DB 224 in step SH2.

Referring to flowchart FG, when the grader browser execution section 311B of the grader terminal 3B receives the grading screen display data by using the grader terminal communication section 31B (step SG3), the grader browser execution section 311B displays the grading screen by using the grader terminal display section 32B based on the received grading screen display data (step SG4). As described above, since the grading screen includes the read image, it is possible for the grader P3 to view the answer given by the answerer P1 on teaching material content printed material IB by using the grader terminal 3B.

Next, the grader browser execution section 311B determines whether or not a score to be given by the grading has been input via the grading screen (step SG4). The grading screen includes a field in which a score is input and a software confirmation button for confirming the score input in this field. When the confirmation button is operated in the state in which a score has been input in this field, the grader browser execution section 311B determines that a score has been input.

When the grader browser execution section 311B determines that a score has been input on the grading screen (step SG4: YES), the grader browser execution section 311B transmits the score information 2242 indicating the input score to the information processing server 2 by using the grader terminal communication section 31B (step SG5). The score information 2242 transmitted to the information processing server 2 is associated with the answerer ID 2233 and the teaching material content ID 2221 included in the grading screen display data received in step SG2.

Referring to the flowchart FH, the server controller 20 of the information processing server 2 receives the score information 2242 from the grader terminal 3B by using the server communication section 21 (step SH5).

Next, the server controller 20 updates the answer management DB 224 based on the received score information 2242 (step SH6). That is to say, in step SH6, the server controller 20 refers to the answer management DB 224 and updates, to the received score information 2242, the score information 2242 of the record including a combination of the answerer ID 2233 and the teaching material content ID 2221 associated with the received score information 2242.

Next, the server controller 20 updates the charging management DB 227 based on the received score information 2242 (step SH7).

Here, a detailed description will be given of the processing of step SH7. In step SH7, the server controller 20 obtains the grading charge information 2224 identified by the teaching material content ID 2221 added to the received score information 2242 from the teaching material content management DB 222. Next, the server controller 20 adds a fee indicated by the obtained grading charge information 2224 to the charge amount indicated by the charge amount information 2271 identified by the answerer ID 2233 added to the received score information 2242. Next, the server controller 20 updates the charge amount indicated by the charge amount information 2271 identified by the answerer ID 2233 added to the received score information 2242 to the charge amount obtained by the addition. The server controller 20 also suitably updates the total amount information 2272 associated with the charge amount information 2271 along with the update of the charge amount information 2271 identified by the answerer ID 2233 added to the received score information 2242.

After the server controller 20 updates the charging management DB 227, the server controller 20 generates grading notification information providing notification that the grader P3 has performed grading (step SH8). The grading notification information includes a URL concerning display of the score information 2242 indicating a score given by the grader P3.

Next, when the server controller 20 generates grading notification information, the server controller 20 transmits the generated grading notification information to the contractor terminal 3A by using the server communication section 21 based on the contractor communication information 2232 identified by the contractor ID 2231 associated with the answerer ID 2233 added to the score information 2242 (step SH9).

As illustrated in flowchart FI, the contractor terminal controller 30A receives the grading notification information by using the contractor terminal communication section 31A (step SI1).

Next, the contractor terminal controller 30A provides notification that the grader P3 has performed grading by using the touch panel 32A based on the received grading notification information (step SI2). In step SI2, a URL included in the grading notification information may also be provided together.

In this manner, when the contractor terminal 3A receives grading answer notification information, the contractor terminal 3A provides notification that the grader P3 has performed grading. Accordingly, it is possible for the contractor P2 to recognize that grading has been performed on the answer given by the answerer P1. Also, since the grading answer notification information includes a URL concerning the display of the score information 2242, it is possible for the contractor browser execution section 311A of the contractor terminal 3A to access the URL based on the operation of the contractor P2 so as to display the score information 2242 on the touch panel 32A. That is to say, it is possible for the contractor P2 to know the score given by the grading to the answer of the answerer P1 by using the contractor terminal 3A.

As described above, the information processing system 1000 includes the information processing server 2 and the multifunction machine 1. The information processing server 2 transmits teaching material content KC and print instruction information instructing printing of the answerer ID 2233 to the multifunction machine 1. When the multifunction machine 1 receives print instruction information from the information processing server 2, the multifunction machine 1 generates teaching material content printed material IB. Also, the multifunction machine 1 reads the print surface IBA of the teaching material content printed material IB on which the answerer P1 has given an answer and transmits the read data 2241 to the information processing server 2. When the information processing server 2 receives the read data 2241 from the multifunction machine 1, the information processing server 2 obtains an answerer ID 2233 from the received read data 2241 and performs processing for providing the read image for the terminal device 3 of the person concerned P4 having a predetermined relationship with the answerer P1 of the obtained answerer ID 2233.

In an information processing method to be performed by an information processing server 2 and a multifunction machine 1, the information processing server 2 transmits print instruction information instructing printing of teaching material content KC and an answerer ID 2233 to the multifunction machine 1. Also, in the information processing method, when the multifunction machine 1 receives print instruction information from the information processing server 2, teaching material content printed material IB is generated, a print surface IBA of teaching material content printed material IB on which an answer has been written by an answerer P1 is read, and read data 2241 is transmitted to the information processing server 2. Also, in the information processing method, when the information processing server 2 receives the read data 2241 from the multifunction machine 1, an answerer ID 2233 is obtained from the received read data 2241, and processing for providing the read image for a terminal device 3 of the person concerned P4 having a predetermined relationship with the answerer P1 of the obtained answerer ID 2233 is performed.

With the information processing system 1000 and by the information processing method, it is possible for the terminal device 3 to obtain read image indicated by the read data 2241, and thus it is possible for the person concerned P4 to use the answer written on the teaching material content printed material IB for grading, viewing, and the like.

When the information processing server 2 receives read data 2241 from the multifunction machine 1, the information processing server 2 transmits a display URL to the contractor terminal 3A based on the answerer ID 2233 obtained from the received read data 2241. Also, when the information processing server 2 receives read data 2241 from the multifunction machine 1, the information processing server 2 transmits a grading URL 2261 to the grader terminal 3B based on the answerer ID 2233 obtained from the received read data 2241.

With this configuration, it is possible for the terminal device 3 to obtain the read image indicated by the read data 2241 based on the received URL, and thus it is possible for the person concerned P4 to easily use the answer given on the teaching material content printed material IB for grading, viewing, and the like.

The information processing system 1000 includes the terminal device 3. When the information processing server 2 receives read data 2241 from the multifunction machine 1, the information processing server 2 transmits first answer notification information to the contractor terminal 3A based on the answerer ID 2233 included in the received read data 2241, and transmits second answer notification information to the grader terminal 3B. When the contractor terminal 3A receives first answer notification information, the contractor terminal 3A notifies the contractor P2 that an answerer P1 has given an answer. When the grader terminal 3B receives second answer notification information, the grader terminal 3B notifies the grader P3 that the answerer P1 has given an answer.

With this configuration, it is possible for the person concerned P4 to recognize that an answer has been given on the teaching material content printed material IB, and thus to use the answer given on the teaching material content printed material IB for grading, viewing, and the like reliably and promptly after getting an answer.

The grader terminal 3B displays a grading screen and transmits the score information 2242 indicating a score input by a grader P3 on the grading screen to the information processing server 2. The information processing server 2 stores the score information 2242 received from the grader terminal 3B in association with the answerer ID 2233 obtained from the read data 2241.

With this configuration, the score information 2242 of the score given by the grader P3 on the answer is stored in association with the answerer ID 2233, and thus it is possible for the grader P3 to suitably perform grading the answer given on the teaching material content printed material IB.

The print instruction information is information for instructing printing of teaching material content KC, an answerer ID 2233, and a teaching material content ID 2221. When the multifunction machine 1 receives print instruction information from the information processing server 2, the multifunction machine 1 generates teaching material content printed material IB on which teaching material content KC, an answerer ID 2233, and a teaching material content ID 2221 are printed. When the information processing server 2 receives score information 2242 from a grader terminal 3B, the information processing server 2 calculates a fee for the grading in accordance with the teaching material content KC indicated by the teaching material content ID 2221 included in the read data 2241 and stores the charge amount information 2271 indicating the calculated fee in association with the answerer ID 2233 included in the read data 2241.

With this configuration, the charge amount information 2271 indicating the fee for the grading by the grader P3 is stored in association with the answerer ID 2233. Accordingly, it is possible to suitably manage the fee for the grading by the grader P3. The fee for the grading by the grader P3 is suitably managed, and thus it becomes possible to collect the fee suitably.

The embodiment described above is only one aspect of the present disclosure, and it is possible to vary and apply the present disclosure in any way within the scope of the present disclosure.

For example, in the embodiment described above, the case in which the contractor P2 is a parent of the answerer P1 has been described by way of example. However, the contractor P2 may be a child of the answerer P1, any one of brothers and sisters of the answerer P1, or the answerer P1 himself or herself.

For example, in the information processing system 1000 according to the embodiment described above, the case in which the information processing server 2 charges the contractor terminal the total of the charge amounts indicated by the total amount information 2272 at a predetermined timing and the contractor P2 makes a payment has been described by way of example. However, the information processing server 2 may access a server provided by a financial institution, a payment service provider, or a fund transfer service provider, and may automatically pay the total of the charge amounts indicated by the total amount information 2272. Also, the information processing server 2 may deposit a certain amount of money from the contractor P2 and collect the total of the charge amounts indicated by the total amount information 2272 from the deposited amount at a predetermined timing. Also, in the embodiment described above, the server controller 20 increments the charge amount every time grading is performed. However, for example, the grading charge may be a monthly fixed rate up to the specified number of times of grading, and when the number of times exceeds a predetermined number, the charge amount may be incremented in addition to the fixed rate.

Also, for example, in the embodiment described above, a serial ink jet method has been described as an example of a printing method of the multifunction machine 1. However, the printing method of the multifunction machine 1 may be a line ink jet method. Also, the printing method of the multifunction machine 1 is not limited to an ink jet method and may be another printing method. Also, the multifunction machine 1 has been described as an example of the printer. However, the printer is not limited to the multifunction machine 1, and may be a printer, such as a printer without having a scan function, and the like. In this case, an external device having a scan function is coupled to a printer, and the printer performs reading by using the coupled external device. Also, the multifunction machine 1 may be an apparatus further having various functions, such as a facsimile function, and the like.

Also, the functions of the multifunction machine controller 10, the server controller 20, the contractor terminal controller 30A, and the grader terminal controller 30B may be implemented by a plurality of processors or semiconductor chips.

Also, each section illustrated in FIG. 2 is an example, and specific implementation is not limited in particular. That is to say, it is not always necessary to provide hardware individually corresponding to each section, and it is possible for one processor to execute a program to implement the functions of the individual sections. Also, in the embodiment described above, some of the functions implemented by software may be implemented by hardware, or some of the functions implemented by hardware may be implemented by software. In addition, it is possible to change the detailed specific configuration of each of the other sections of the multifunction machine 1, the information processing server 2, and the terminal device 3 in any way without departing from the spirit and scope of the present disclosure.

Also, for example, the operation illustrated in FIG. 5, FIG. 6, and FIG. 7 is divided into step units in accordance with the main processing content to facilitate understanding of the operation of each device of the information processing system 1000. The present disclosure is not limited by the way of dividing the operation into processing units and the names thereof. The operation may be further divided into many step units in accordance with the processing content. Also, one step unit may be divided into units so as to include further processing. Also, the order of the steps may be suitably changed within a range that causes no problem to the spirit of the present disclosure.

What is claimed is:

1. An information processing system comprising:
a server; and
a printer, which is located at a residence of an answerer, configured to communicate with the server, wherein the server is configured to transmit print instruction information instructing the printer to print teaching material content with answerer identification information identifying the answerer who is to answer the teaching material content, the printer is configured to generate, based on the print instruction information, printed material on which the teaching material content with the answerer identification information are printed, the printer is configured to read a print surface of the printed material filled with an answer given by the answerer and transmits read data representing a read image of the print surface of the printed material filled with the answer given by the answerer, the server is configured to acquire the answerer identification information and a grading uniform resource locator (URL) printed on the printed material from the received read data by acquiring the answerer identification information from the read image of the print surface of the printed material filled with the answer given by the answerer, the server is configured to perform processing of the read data so that the read image is accessible by a terminal device of a person concerned that is not the answerer but is a person having a predetermined relationship with the answerer indicated by the acquired answerer identification information, the read image being of the print surface of the printed material filled with the answer given by the answerer, the person concerned includes a grader who grades the answer, and the grading URL is used by the grader to perform grading of the answer.

2. The information processing system according to claim 1, wherein the server is configured to transmit acquisition information for acquiring the read image of the print surface of the printed material filled with the answer given by the answerer to the terminal device.

3. The information processing system according to claim 2, further comprising the terminal device, wherein the server is configured to transmit, to the terminal device together with the acquisition information, answer notification information providing notification that the answer was given, and the terminal device is configured to notify the person concerned that the answer was given.

4. The information processing system according to claim 2, further comprising the terminal device, wherein the terminal device is configured to display a grading screen for grading the answer as acquisition of the read image based on the acquisition information and transmits, to the server, score information indicating a score input by the grader on the grading screen, the read image being of the print surface of the printed material filled with the answer given by the answerer, and the server is configured to store the score information received from the terminal device in association with the answerer identification information acquired from the read data.

5. The information processing system according to claim 4, wherein the print instruction information is information instructing the printer to print the teaching material content, the answerer identification information, and teaching material content identification information identifying the teaching material content, the printer is configured to generate, based on the print instruction information, the printed material on which the teaching material content, the answerer identification information, and the teaching material content identification information are printed, the server is configured to acquire the teaching material content identification information printed on the printed material from the received read data, and the server is configured to calculate, based on the score information from the terminal device, a fee for grading in accordance with the teaching material content indicated by the teaching material content identification information acquired from the read data and stores fee information indicating the calculated fee in association with the answerer identification information acquired from the read data.

6. The information processing system according to claim 1, wherein the server is further configured to add the answerer identification information and the grading URL to a grading URL management database.

7. The information processing system according to claim 1, wherein the server is configured to generate a grading screen including the read data and send the grading screen to the terminal device of the grader.

8. An information processing method to be performed by a server and a printer configured to communicate with the server, the information processing method comprising:

transmitting, by the server, print instruction information instructing the printer, which is located at a residence of an answerer, to print teaching material content with answerer identification information identifying the answerer who is to answer the teaching material content;

upon receiving the print instruction information, generating, by the printer, printed material on which the teaching material content with the answerer identification information are printed;

reading, by the printer, a print surface of the printed material filled with an answer given by the answerer and transmitting read data representing a read image of the print surface of the printed material filled with the answer given by the answerer;

upon receiving the read data, acquiring, by the server, the answerer identification information and a grading uniform resource locator (URL), printed on the printed material from the received read data by acquiring the answerer identification information from the read image of the print surface of the printed material filled with the answer given by the answerer; and performing, by the server, processing of the read data so that the read image is accessible by a terminal device of a person concerned that is not the answerer but is a person having a predetermined relationship with the answerer indicated by the acquired answerer identification information, the read image being of the print surface of the printed material filled with the answer given by the answerer, the person concerned includes a grader who grades the answer, and the grading URL is used by the grader to perform grading of the answer.

* * * * *